E. F. KANDLBINDER.
HOUSEHOLD UTENSIL.
APPLICATION FILED AUG. 11, 1910.
990,561.
Patented Apr. 25, 1911.
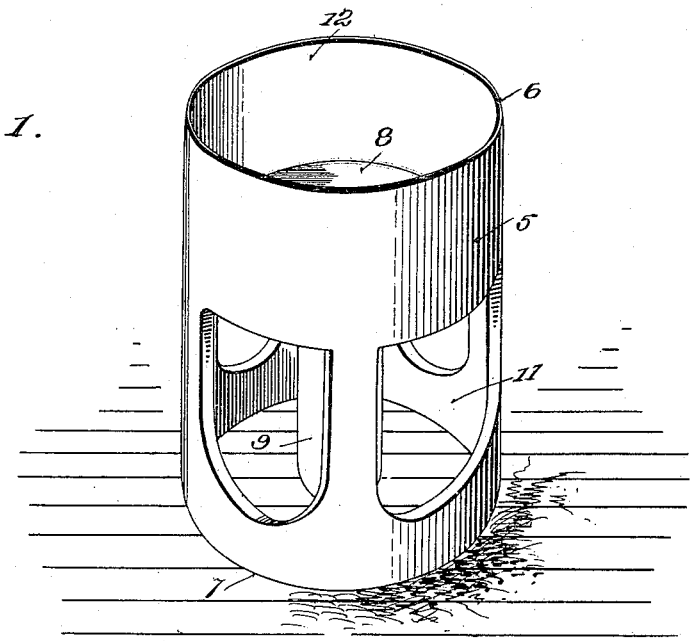
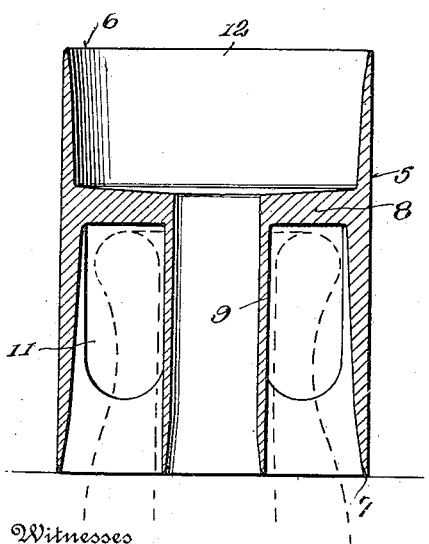
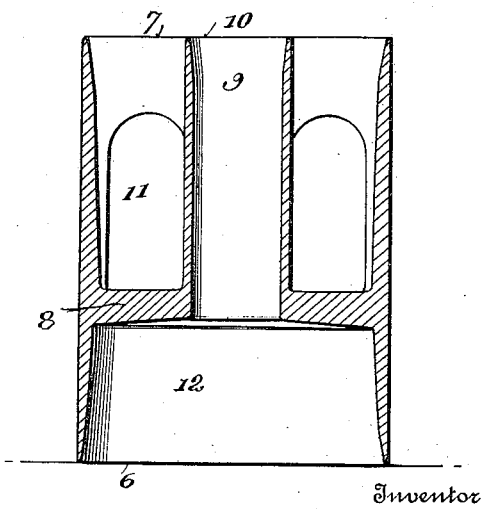
Inventor
E. F. Kandlbinder

UNITED STATES PATENT OFFICE.

EMELIA F. KANDLBINDER, OF SHREVEPORT, LOUISIANA.

HOUSEHOLD UTENSIL.

990,561.  Specification of Letters Patent.  Patented Apr. 25, 1911.

Application filed August 11, 1910. Serial No. 576,676.

*To all whom it may concern:*

Be it known that I, EMELIA F. KANDLBINDER, citizen of the United States, residing at Shreveport, in the parish of Caddo and State of Louisiana, have invented certain new and useful Improvements in Household Utensils, of which the following is a specification.

This invention relates to household utensils and has for its object the provision of a comparatively simple and thoroughly efficient device of this character, embodying in its structure, a biscuit cutter, apple corer, funnel and doughnut cutter.

A further object of the invention is to provide a household utensil including a body portion having its opposite ends provided with cutting edges, and its central portion formed with a tubular member or core which performs the dual function of an apple corer and funnel, there being openings formed in the body portion and surrounding said core to permit the insertion of the finger of the operator to assist in dislodging the dough when the device is used as a doughnut cutter.

A still further object of the invention is generally to improve this class of devices, so as to increase their utility, durability and efficiency.

Further objects and advantages will appear in the following description, it being understood that various changes in form, proportions and minor details of construction may be resorted to within the scope of the appended claims.

For a full understanding of the invention and the merits thereof, reference is to be had to the following description and accompanying drawings, in which:

Figure 1 is a perspective view of a combined biscuit cutter, apple corer, funnel and doughnut cutter, constructed in accordance with my invention, showing the position of the device when the utensil is used for cutting doughnuts; Fig. 2 is a longitudinal sectional view, showing the device used as a funnel; Fig. 3 is a similar view, showing the device reversed and used as a biscuit cutter.

Corresponding and like parts are referred to in following description and indicated in all the views of the drawings by the same reference characters.

The improved household utensil forming the subject matter of the present invention comprises a hollow body portion 5 preferably cylindrical in shape, as shown, and formed of metal, glass, porcelain or other suitable material, one end of said body portion being provided with a cutting edge 6 constituting a biscuit cutter, and the other end thereof formed with a similar cutting edge 7 for cutting doughnuts.

Extending transversely across the body portion 5 in spaced relation to the cutting edge 6 thereof, is a partition or diaphragm 8 having a depending tubular member or core 9. One end of the tubular member or core 9 opens through the partition 8, while the other end thereof is disposed in horizontal alinement with the cutting edge 7 and provided with a similar cutting edge 10, which latter co-acts with the cutting edge 7 when the device is used as a doughnut cutter.

The side walls of the body portion 5 are preferably formed with a plurality of openings 11 extending from the bottom of the partition 8 to a point near the cutting edge 7, so as to permit the operator to insert his or her finger through the openings for the purpose of dislodging the dough adhering to the walls of the core 9 and body portion 5 when using the device as a doughnut cutter.

It will here be noted that the partition 8 is spaced from the cutting edge 6 to form a liquid receiving chamber 12 at one end of the body portion when the device is used as a funnel. Thus it will be seen that by grasping the body portion with the cutting edge 6 extending downwardly, the utensil may be used for cutting biscuits, and by reversing the device so that the cutting edges 7 and 10 will extend downwardly, the utensil may be used for cutting doughnuts. It will also be seen that by pressing the cutting edge 10 of the tubular member 9 over the central portion of an apple, the core thereof may be readily removed. When it is desired to use the device as a funnel, the tubular member 9 is inserted in the mouth of a bottle, jar or other container and liquid poured in the chamber 12, the partition 8, by engagement with the top of the jar or bottle forming a stop for the device and serving to limit the downward movement of the tubular member 9 within the mouth of said bottle.

The device is extremely simple in construction and may be manufactured and placed on the market at a comparatively small cost.

Having thus described the invention, what is claimed as new is:

1. A device of the class described including a hollow body portion having oppositely disposed cutting edges, and a tubular member centered within and extending for a portion of the length of the body portion, there being an opening formed in the side walls of the body portion at said tubular member.

2. A device of the class described including a hollow body portion having oppositely disposed cutting edges and provided with a transverse partition, and a tubular member having one end thereof opening through and disposed flush with one face of the partition and its other end disposed concentric with the adjacent cutting edge of the body portion.

3. A device of the class described including a hollow body portion having oppositely disposed cutting edges, a transverse partition spaced from one of the cutting edges, and a tubular member depending from the partition and its other end disposed in horizontal alinement with the other cutting edge of the body portion, there being openings formed in the side walls of the body portion at said tubular member.

4. A device of the class described including a hollow body portion having oppositely disposed cutting edges, a partition extending transversely across the body portion in spaced relation to one cutting edge thereof to form a liquid receiving chamber, and a tubular member depending from the partition and spaced from the interior walls of said body portion, one end of the tubular member communicating with the liquid chamber and disposed flush with one face of the partition and the other end thereof being provided with a cutting edge disposed in horizontal alinement with the adjacent cutting edge of the body portion.

5. A device of the class described including a hollow body portion having oppositely disposed cutting edges, a partition extending transversely across said body portion in spaced relation to one end thereof, and a tubular member depending from the bottom of the partition and having its lower end spaced from the interior walls of the body portion and provided with a cutting edge disposed in the same horizontal plane with the adjacent cutting edge of said body portion, there being openings formed in the side walls of the body portion and surrounding the tubular member.

6. A device of the class described including a hollow cylindrical body portion having its opposite ends beveled to form cutting edges, a transverse partition extending across the body portion and spaced from one of the cutting edges thereof to form a liquid receiving chamber, and a tubular member depending from the partition and having its lower end spaced from and disposed concentric with the interior walls of the body portion and provided with a cutting edge disposed in the same horizontal plane with the adjacent end of said body portion, there being a series of openings formed in the side walls of the body portion and extending from the bottom of the partition to points adjacent one cutting edge of said body portion.

In testimony whereof I affix my signature in presence of two witnesses.

EMELIA F. KANDLBINDER. [L. S.]

Witnesses:
 JNO. B. FILE,
 W. A. ADAMS.

---

Copies of this patent may be obtained for five cents each, by addressing the "Commissioner of Patents. Washington, D. C."